United States Patent
Shelton et al.

(10) Patent No.: US 8,852,054 B2
(45) Date of Patent: Oct. 7, 2014

(54) MODULATING ENGINE TORQUE TO SYNCHRONIZE ENGINE SPEED WITH MOTOR SPEED FOR DISCONNECT CLUTCH ENGAGEMENT IN HYBRID VEHICLE

(75) Inventors: Matthew John Shelton, Grosse Ile, MI (US); Hong Jiang, Birmingham, MI (US); Zhengyu Dai, Canton, MI (US); Charles Chunlin Liu, Plymouth, MI (US); Felix Nedorezov, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 380 days.

(21) Appl. No.: 13/465,365

(22) Filed: May 7, 2012

(65) Prior Publication Data
US 2013/0296110 A1    Nov. 7, 2013

(51) Int. Cl.
*B60W 10/08* (2006.01)

(52) U.S. Cl.
USPC ............................ 477/5; 475/5; 180/65.265

(58) Field of Classification Search
USPC .............. 477/5; 475/5; 180/65.265; 903/902
See application file for complete search history.

(56) References Cited

U.S. PATENT DOCUMENTS

| | | | |
|---|---|---|---|
| 5,713,425 A | 2/1998 | Buschhaus et al. | |
| 6,364,807 B1 | 4/2002 | Koneda et al. | |
| 8,712,613 B2 * | 4/2014 | Yoshida et al. | 477/181 |
| 8,758,192 B2 * | 6/2014 | Smith et al. | 477/5 |
| 2009/0312895 A1 | 12/2009 | Kim et al. | |
| 2011/0118078 A1 | 5/2011 | Kraska et al. | |
| 2011/0118915 A1 * | 5/2011 | Ortmann et al. | 180/65.265 |
| 2012/0178585 A1 * | 7/2012 | Schoenek et al. | 477/5 |
| 2013/0274969 A1 * | 10/2013 | Wang et al. | 477/5 |
| 2014/0046529 A1 * | 2/2014 | Gibson et al. | 477/167 |

* cited by examiner

*Primary Examiner* — Jacob S Scott
(74) *Attorney, Agent, or Firm* — James Dottavio; Brooks Kushman P.C.

(57) ABSTRACT

A system and method for controlling a hybrid vehicle having an engine, a traction motor, and a transmission selectively coupled in series by a clutch include modulating engine torque while the clutch is disengaged and while engine speed is less than motor speed to increase the engine speed. The clutch is engaged to connect the engine to the motor in response to the engine speed exceeding the motor speed.

17 Claims, 3 Drawing Sheets

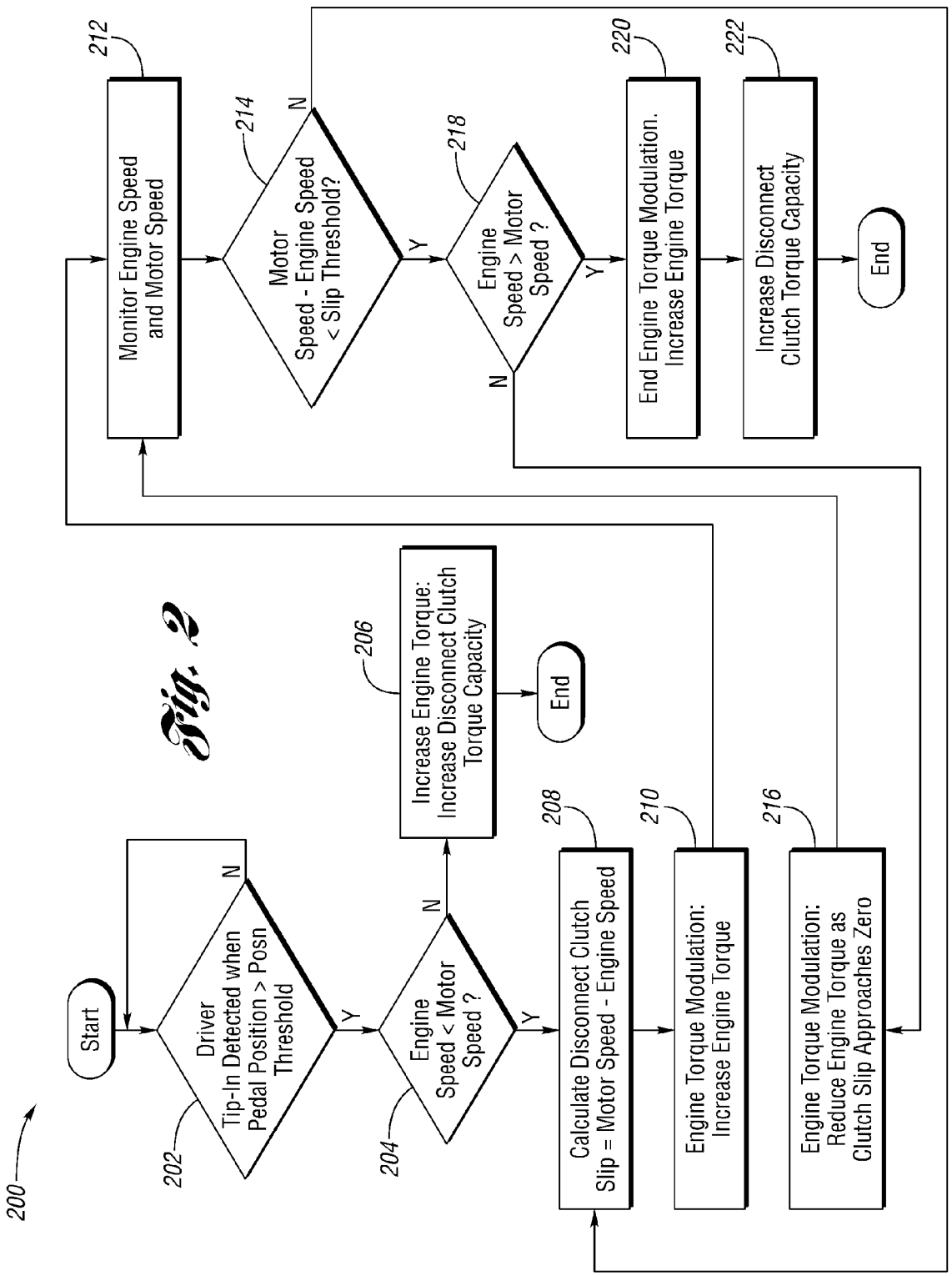

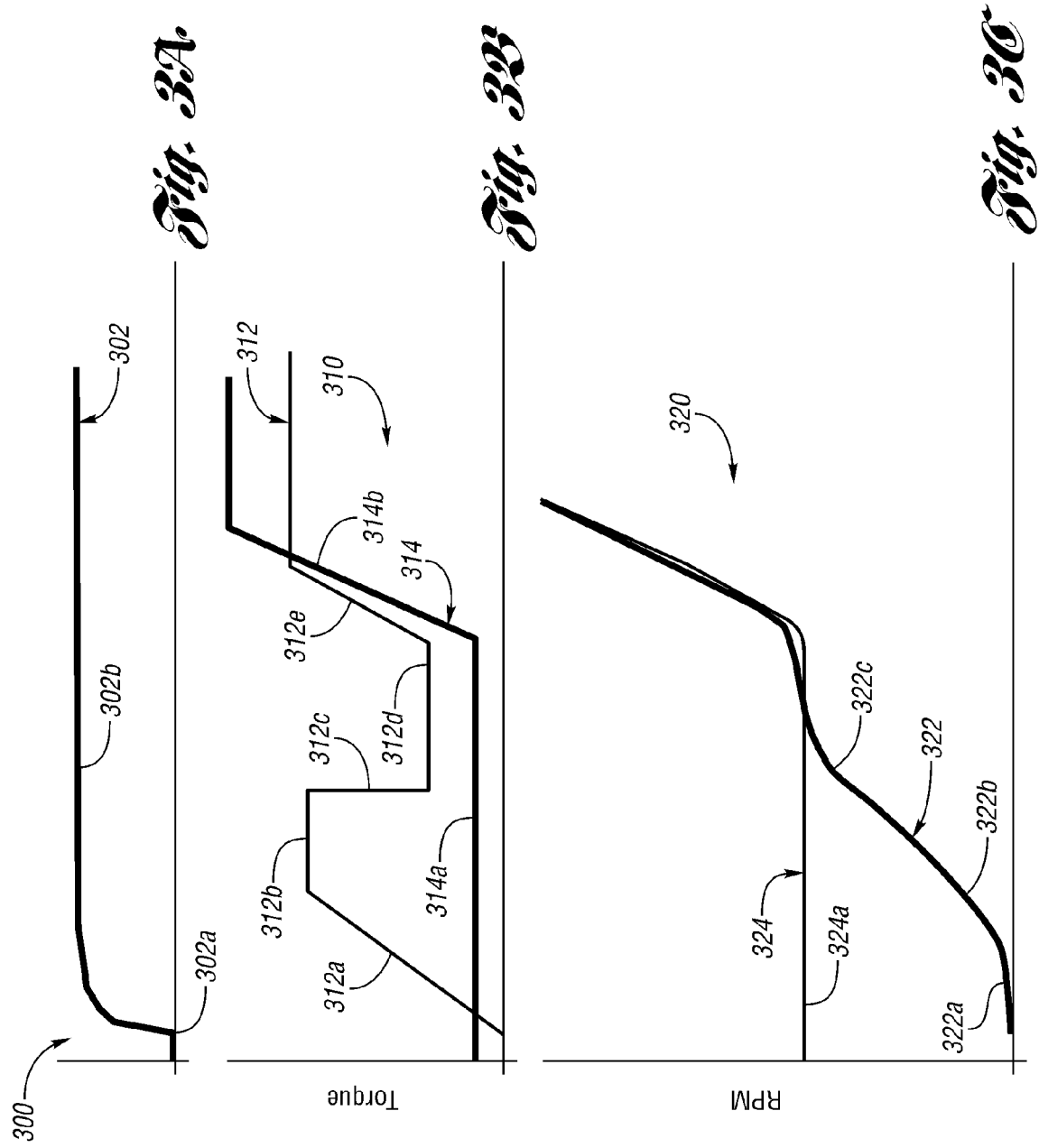

MODULATING ENGINE TORQUE TO SYNCHRONIZE ENGINE SPEED WITH MOTOR SPEED FOR DISCONNECT CLUTCH ENGAGEMENT IN HYBRID VEHICLE

TECHNICAL FIELD

The present invention relates to connecting an engine with a motor via a disconnect clutch in a hybrid vehicle powertrain upon a tip-in event.

BACKGROUND

A hybrid electric vehicle powertrain includes an engine and an electric motor, wherein torque (or power) produced by the engine and/or by the motor can be transferred through a transmission to the vehicle drive wheels to propel the vehicle. A traction battery supplies energy to the motor for the motor to produce the motor torque for propelling the vehicle.

In a modular hybrid transmission ("MHT") configuration, the engine is connectable to the motor by a disconnect clutch and the motor is connected to the transmission. The engine, the disconnect clutch, the motor, and the transmission are connected sequentially in series.

SUMMARY

Embodiments of the present invention are directed to a controller and a control strategy for a hybrid electric vehicle having a motor connected to a transmission and an engine connectable to the transmission via a disconnect clutch and the motor. The engine is connected to the motor when the disconnect clutch is closed (i.e., engaged). As such, the engine is connected to the transmission via the motor when the disconnect clutch is engaged. The engine is disconnected from the motor when the disconnect clutch is opened (i.e., disengaged). As such, when the disconnect clutch is disengaged, the engine is disconnected from the transmission as a result of being disconnected from the motor.

The controller and the control strategy modulate the engine torque to synchronize the engine speed with the motor speed. The engine speed is to be synchronized with the motor speed in order to enable the disconnect clutch to be moved from a disengaged state to an engaged state. The engine torque may be modulated to synchronize the engine speed and the motor speed in response to a (heavy) tip-in event. Prior to the tip-in event, for example, the vehicle is coasting and/or is being propelled at least predominantly with motor torque. As such, the disconnect clutch is (at least partially) disengaged such that the engine is disconnected from the transmission. Consequently, the engine speed is relatively much smaller than the motor speed. The tip-in event occurs, for instance, when the driver of the vehicle steps into accelerator pedal during a coast. The engine speed is relatively much smaller than the motor speed because the driver was initially off the accelerator pedal. As the driver steps into the accelerator pedal, engine torque from the engine is to be provided to the transmission. As such, the disconnect clutch is to be moved from the disengaged state to the engaged state in order to connect the engine to the transmission via the motor. However, the engine speed is to be increased to be at least the same as or slightly more than the motor speed before the disconnect clutch is to be moved to the engaged state.

Thus, the controller and the control strategy modulate the engine torque such that the engine torque is initially increased rapidly thereby causing the engine speed to increase rapidly. The rapidly increased engine torque causes the engine speed to rapidly increase from its relatively low level towards the relatively high level of the motor speed. Once the engine speed approaches near the motor speed (or perhaps becomes equal to or slightly greater than the motor speed), the controller and the control strategy modulate the engine torque to cut the engine torque to a reduced level. Cutting the engine torque to a reduced level causes the engine speed to increase slowly. Thus, assuming that the engine speed was just less than the motor speed, the engine speed increases to become at least the same as the motor speed. The controller and the control strategy consider the engine speed and the motor speed to be synchronized when the engine speed is slightly greater than the motor speed. When the engine speed and the motor speed are synchronized, the controller and the control strategy control the disconnect clutch to move from the disengaged state to the engaged state. Once the disconnect clutch is in the engaged state, the engine is connected to the transmission via the motor thereby enabling the engine to provide engine torque to the transmission in order to propel the vehicle.

In an embodiment, a method for a vehicle having an engine connectable to a traction motor via a clutch is provided. The method includes modulating engine torque while the clutch is disengaged and while engine speed is less than motor speed to increase the engine speed. The method further includes engaging the clutch to connect the engine to the motor in response to the engine speed exceeding the motor speed.

Modulating engine torque may include increasing the engine torque to increase the engine speed while the engine speed is less than the motor speed by more than a slip threshold and reducing (e.g., cutting) the engine torque in response to the engine speed being less than the motor speed by less than the slip threshold. The method may further include increasing the engine torque at a rate dependent on a difference between the motor speed and the engine speed prior to the engine torque being increased. The method may further include increasing the engine torque based on a difference between the motor speed and the engine speed prior to the engine torque being increased. The engine torque may be decreased based on a difference between the motor speed and the engine speed upon detecting that the engine speed is less than the motor speed by less than the slip threshold. The engine torque may be increased while the disconnect clutch is being engaged. Modulating the engine torque may occur in response to initiation of a tip-in event.

In an embodiment, a system for a vehicle having an engine selectively coupled in series with a traction motor and a transmission by a clutch is provided. The system includes a controller configured to modulate engine torque while the clutch is disengaged and while engine speed is less than motor speed to increase the engine speed and to engage the clutch in response to the engine speed becoming greater than the motor speed.

In an embodiment, a hybrid vehicle is provided. The vehicle includes a traction motor connected to a transmission, an engine selectively coupled in series with the motor by a clutch, and a controller communicating with the motor and the engine. The controller is configured to modulate engine torque while the clutch is disengaged and while engine speed is less than motor speed to increase the engine speed, and to engage the clutch in response to the engine speed exceeding the motor speed.

Additional objects, features, and advantages of embodiments of the present invention will become more readily apparent from the following detailed description when taken

BRIEF DESCRIPTION OF THE DRAWINGS

FIG. 2 illustrates a flowchart describing operation of a control strategy for modulating engine torque to synchronize engine speed with motor speed for disconnect clutch engagement during a tip-in event in a hybrid electric vehicle in accordance with an embodiment of the present invention;

FIG. 3A illustrates a graph having a plot of the position of the accelerator pedal of the vehicle versus time during the tip-in event;

FIG. 3B illustrates a graph having a plot of the engine torque and a plot of the disconnect clutch torque capacity versus time according to the operation of the control strategy; and FIG. 3C illustrates a graph having a plot of the engine speed and a plot of the motor speed versus time according to the operation of the control strategy.

DETAILED DESCRIPTION

Figure 1:
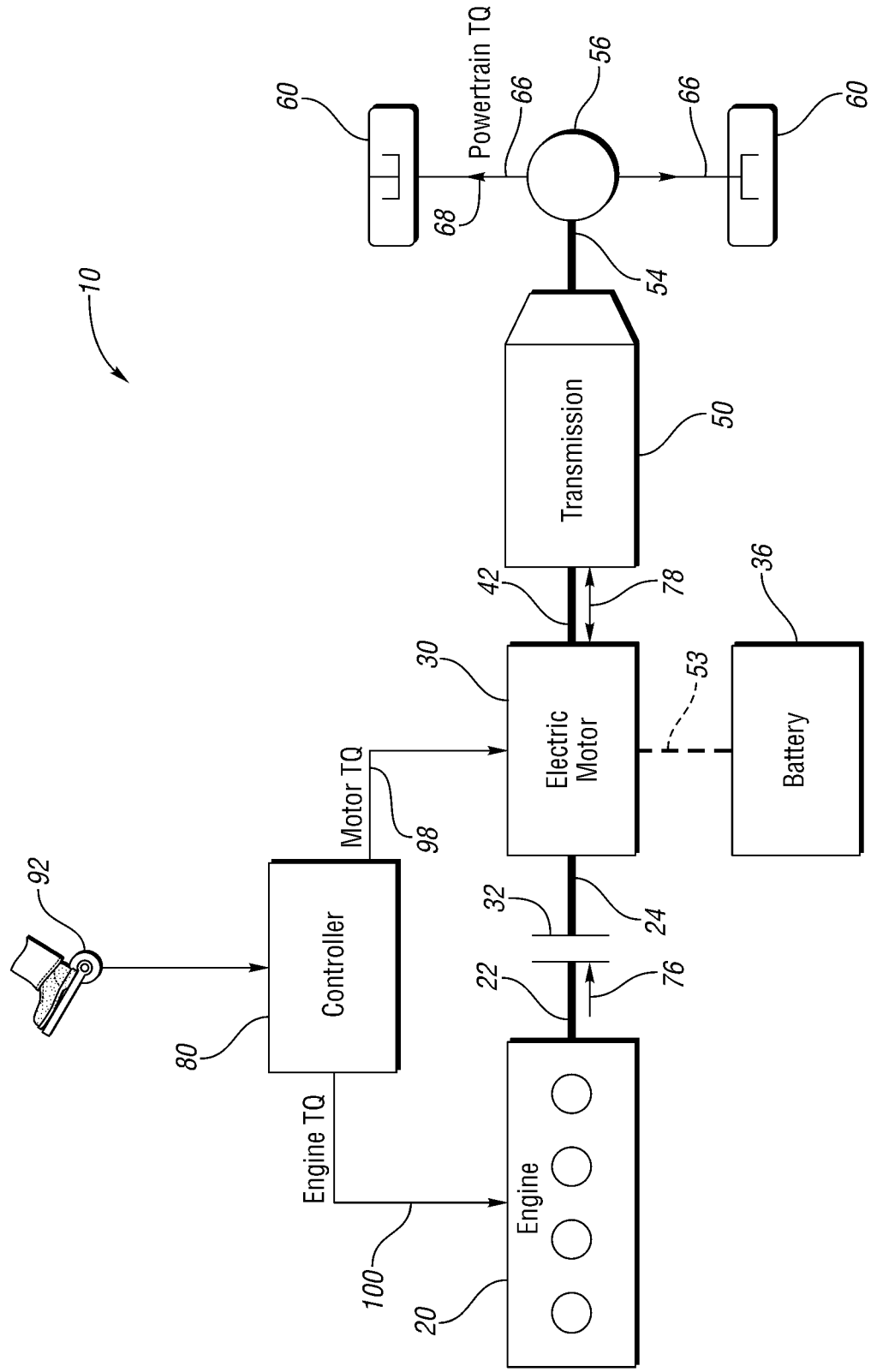
FIG. 1 illustrates a block diagram of an exemplary hybrid electric vehicle powertrain in accordance with an embodiment of the present invention.

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring now to FIG. 1, a block diagram of an exemplary powertrain system 10 for a hybrid electric vehicle in accordance with an embodiment of the present invention is shown. Powertrain system 10 includes an engine 20, an electric machine such as an electric motor/generator 30 ("motor"), a traction battery 36, and a multiple-ratio automatic transmission 50.

Engine 20 and motor 30 are drive sources for the vehicle. Engine 20 is connectable to motor 30 through a disconnect clutch 32 whereby engine 20 and motor 30 are connected in series. Motor 30 is connected to the input side of transmission 50. For example, motor 30 may be connected to transmission 50 via a torque converter between motor 30 and the input side of transmission 50. The input side of transmission 50 is connected in series with both engine 20 and motor 30 when engine 20 is connected to motor 30 via disconnect clutch 32. In this case, transmission 50 is connected to motor 30 while at the same time being connected to engine 20 via motor 30. On the output side, transmission 50 is connected to the drive wheels 60 of the vehicle. The driving force applied from engine 20 and/or motor 30 is transmitted through transmission 50 to drive wheels 60 thereby propelling the vehicle.

Engine 20 has an engine shaft 22 connectable to an input shaft 24 of motor 30 through disconnect clutch 32. Although disconnect clutch 32 is described and illustrated as a hydraulic clutch, other types of clutches may be used. Motor 30 has an output shaft 42 connected to the input side of transmission 50.

Transmission 50 includes multiple gear ratios. The output side of transmission 50 includes an output shaft 54 that is connected to a differential 56. Drive wheels 60 are connected to differential 56 through respective axles 66. With this arrangement, transmission 50 transmits a powertrain output torque 68 to drive wheels 60.

Engine 20 is a primary source of power for powertrain system 10. Engine 20 is an internal combustion engine such as a gasoline, diesel, or natural gas powered engine. Engine 20 generates an engine power having an engine torque 76 that is supplied to transmission 50 when engine 20 and motor 30 are connected via disconnect clutch 32. The engine power corresponds to the product of engine torque 76 and the engine speed of engine 20. The engine speed of engine 20 is the speed on the input side of disconnect clutch 32. To drive the vehicle with engine 20, at least a portion of engine torque 76 passes from engine 20 through disconnect clutch 32 to motor 30 and then from motor 30 to transmission 50.

Traction battery 36 is a secondary source of power for powertrain system 10. Motor 30 is linked to battery 36 through wiring 53. Depending on the particular operating mode of the vehicle, motor 30 either converts electric energy stored in battery 36 into a motor power having a motor torque 78 or sends a corresponding amount of electrical power to battery 36. The motor power corresponds to the product of motor torque 78 and the motor speed of motor 30. The motor speed of motor 30 is the speed on the output side of disconnect clutch 32 as well as the speed on the output side of motor 30. To drive the vehicle with motor 20, motor torque 78 is transmitted from motor 30 to transmission 50. When generating electrical power for storage in battery 36, motor 30 obtains power either from engine 20 in a driving mode or from the inertia in the vehicle as motor 30 acts as a brake in what is referred to as a regenerative braking mode.

As described, engine 20, disconnect clutch 32, motor 30, and transmission 50 are connectable sequentially in series as illustrated in FIG. 1. As such, powertrain system 10 represents a parallel or modular hybrid transmission ("MHT") configuration in which engine 20 is connected to motor 30 by disconnect clutch 32 with motor 30 being connected to transmission 50.

Depending on whether disconnect clutch 32 is engaged or disengaged determines which input torques 76 and 78 are transferred to transmission 50. For example, if disconnect clutch 32 is disengaged, then only motor torque 78 is supplied to transmission 50. If disconnect clutch 32 is engaged, then both engine torque 76 and motor torque 78 are supplied to transmission 50. Of course, if only engine torque 76 is desired for transmission 50, disconnect clutch 32 is engaged, but motor 30 is not energized such that engine torque 76 is only supplied to transmission 50.

Transmission 50 includes planetary gear sets that are selectively placed in different gear ratios by selective engagement of friction elements in order to establish the desired multiple drive ratios. The friction elements are controllable through a shift schedule that connects and disconnects certain elements of the planetary gear sets to control the ratio between the transmission output and the transmission input. Transmission 50 is automatically shifted from one ratio to another based on the needs of the vehicle. Transmission 50 then provides powertrain output torque 68 to output shaft 54 which ultimately drives drive wheels 60. The kinetic details of transmission 50 can be established by a wide range of transmission arrangements. Transmission 50 is an example of a transmission arrangement for use with embodiments of the present invention. Any multiple ratio transmission that accepts input torque(s) from an engine and/or a motor and then provides torque to an output shaft at the different ratios is acceptable for use with embodiments of the present invention.

Powertrain system 10 further includes a vehicle system controller 80 and an accelerator pedal 92 in communication with controller 80. The driver of the vehicle depresses accelerator pedal 92 to propel the vehicle. In response, a total drive command based on the positioning of accelerator pedal 92 is provided to controller 80. Controller 80 apportions the total drive command between the engine power and the motor power to be provided to transmission 50 for propelling the vehicle. In particular, controller 80 apportions the total drive command between (i) an engine torque signal 100 (which represents the amount of engine torque 76 to be provided from engine 20, operating at a corresponding engine speed, to transmission 50 for propelling the vehicle) and (ii) a motor torque signal 98 (which represents the amount of motor torque 78 to be provided from motor 30, operating at a corresponding motor speed, to transmission 50 for propelling the vehicle). In turn, engine 20 generates the engine power having engine torque 76 and motor 30 generates the motor power having motor torque 78 for propelling the vehicle. Both engine torque 76 and motor torque 78 are supplied to transmission 50 (assuming that engine 20 is connected to motor 30 via disconnect clutch 32) such that the vehicle is propelled.

Referring now to FIG. 2 and FIGS. 3A, 3B, and 3C, with continual reference to the HEV of FIG. 1, a control strategy for modulating engine torque 76 to synchronize the engine speed with the motor speed for engagement of disconnect clutch 32 during a tip-in event in accordance with an embodiment of the present invention will be described. The control strategy may be implemented by controller 80. FIG. 2 illustrates a flowchart 200 describing operation of the control strategy. FIG. 3A illustrates a graph 300 having a plot 302 of the position of accelerator pedal 92 versus time during the tip-in event. FIG. 3B illustrates a graph 310 having a plot 312 of engine torque 76 and a plot 314 of the torque capacity of disconnect clutch 32 versus time according to the operation of the control strategy. FIG. 3C illustrates a graph 320 having a plot 322 of the engine speed and a plot 324 of the motor speed versus time according to the operation of the control strategy.

The operation of the control strategy includes modulating engine torque 76 in order to synchronize the engine speed (i.e., the speed on the input side of disconnect clutch 32) with the motor speed (i.e., the speed on the output side of disconnect clutch 32). Once the engine speed is synchronized with the motor speed, disconnect clutch 32 is controlled to move from a disengaged state to an engaged state to thereby connect engine 20 to transmission 50 via motor 30.

The operation of the control strategy may begin in response to a tip-in event as indicated in block 202. For example, the tip-in event is detected when the position of accelerator pedal 92 is greater than a pedal position threshold in response to the driver depressing accelerator pedal 92. Prior to the tip-in event, the driver is not depressing accelerator pedal 92 because, for instance, the vehicle is coasting. Plot portion 302a in graph 300 indicates the transition in the position of accelerator pedal 92 from not being depressed to being depressed upon the occurrence of the tip-in event. Plot portion 302b in graph 300 indicates that accelerator pedal 92 is depressed by the driver during the tip-in event.

Prior to the tip-in event, disconnect clutch 32 is (at least partially) disengaged such that engine 20 is disconnected from motor 30 and is thereby disconnected from transmission 50. Disconnect clutch 32 has a small torque capacity when disengaged. Likewise, the engine speed is likely to be much smaller than the motor speed at the beginning of the tip-in event. This is because the driver was off of accelerator pedal 92 prior to the tip-in event. As the driver steps into accelerator pedal 92, engine torque 76 is to be provided to transmission 50. As such, disconnect clutch 32 is to be moved from the disengaged state to the engaged state in order to connect engine 20 to transmission 50 via motor 30. However, the engine speed is to be increased to be at least the same as or slightly more than the motor speed before disconnect clutch 32 is to be moved to the engaged state.

Thus, the operation of the control strategy continues with checking whether the engine speed is smaller than the motor speed as indicated in decision block 204. If the engine speed happens to be greater than the motor speed, then engine torque 76 along with the torque capacity of disconnect clutch 32 are increased as indicated in block 206. That is, engine torque 76 is increased and disconnect clutch 32 is moved to the engaged state. The operation of the control strategy is then terminated.

Under exemplary scenarios described herein such as the vehicle coasting for some time prior to the tip-in event, the engine speed will likely be smaller than the motor speed. For example, as shown in graph 320, plot portion 322a indicates the engine speed at the beginning of the tip-in event and plot portion 324a indicates the motor speed at the beginning of the tip-in event. As shown, the engine speed is relatively much less than the motor speed at the beginning of the tip-in event. As such, the operation of the control strategy continues from decision block 204 to block 208 instead of to block 206. In block 208, the engine speed and the motor speed are compared to calculate how much smaller the engine speed is to the motor speed. In particular, the slip of disconnect clutch 32 is calculated in which the disconnect clutch slip is the engine speed subtracted from the motor speed. As shown in graph 320, the disconnect clutch slip (i.e., the difference between plot portion 324a of the motor speed and plot portion 322a of the engine speed) is relatively large at the beginning of the tip-in event.

In turn, the operation of the control strategy continues with modulating engine torque 76 as indicated in block 210. In particular, engine torque 76 is initially increased rapidly thereby causing the engine speed to increase rapidly. Plot portion 312a of graph 310 indicates engine torque 76 increasing rapidly. The rate at which engine torque 76 is increased as indicated by the slope of plot portion 312a depends on the disconnect clutch slip (which was calculated in block 208). In particular, the rate of increase of engine torque 76 is in proportion to the disconnect clutch slip such that the rate of engine torque increase is larger with a larger disconnect clutch slip. Once engine torque 76 has been raised to the desired level, engine torque 76 is maintained as indicated at this increased level as indicated by plot portion 312b in graph 310. Plot portion 322b of graph 320 indicates the engine speed increasing rapidly in conjunction with the increased engine torque 76. As such, the engine speed increases rapidly from its relatively low level (indicated by plot portion 322a) towards the relatively high level of the motor speed.

The operation of the control strategy continues with monitoring the engine speed and the motor speed as indicated in block 212. Next, in decision block 214, the engine speed and the motor speed are compared with one another to calculate whether the engine speed is sufficiently near to the motor speed (i.e., whether the engine speed subtracted from the motor speed is less than a small slip threshold). If not, then the operation reverts back to blocks 208, 210, and 212 where the disconnect clutch slip is calculated, the rapid increase in engine torque 76 is maintained to maintain the corresponding increase in the engine speed, and the engine speed and the motor speed are monitored again such that the comparison between the engine speed and the motor speed in decision block 214 is repeated.

Upon the engine speed becoming sufficiently near the motor speed, the operation of the control strategy continues to block 216. Briefly, in graph 320, plot portion 322c compared to plot 324 of the motor speed indicates that the engine speed is sufficiently near the motor speed. In block 216, the control strategy modulates engine torque 76 to cut the engine torque to a reduced level. Plot portion 312c in graph 310 indicates engine torque 76 being cut and plot portion 312d in graph 310 indicates the reduced level of engine torque 76. Cutting engine torque 76 to a reduced level causes the engine speed to increase slowly. Thus, the engine speed increases to become at least the same as the motor speed as shown by the intersection of plots 322 and 324 in graph 320. The control strategy considers the engine speed and the motor speed to be synchronized when the engine speed is slightly greater than the motor speed.

Upon detection of the engine speed being slightly greater than the motor speed in decision block 218 (such that the engine speed and the motor speed are synchronized), the operation of the control strategy continues with ending the engine torque modulation and instead simply increasing engine torque 76 to a desired level sufficient for meeting the driver power demand as indicated in block 220. Plot portion 312e of graph 310 indicates this increase in engine torque 76. During this time, the control strategy also controls disconnect clutch 32 to move from the disengaged state to the engaged state to thereby increase the torque capacity of disconnect clutch 32 as indicated in block 222. Plot portion 314b of graph 310 indicates the torque capacity of disconnect clutch 32 being increased as a result of disconnect clutch 32 being moved from the disengaged state to the engaged state. Also, plot portion 314a of graph 310 indicates the (minimal to non-existent) torque capacity of disconnect clutch 32 while disconnect clutch 32 is in the disengaged state. Once disconnect clutch 32 is in the engaged state, engine 20 is connected to transmission 50 via motor 32 thereby enabling engine torque 76 to be provided to transmission 50 in order to propel the vehicle.

As described, embodiments of the present invention are directed to a control strategy for a hybrid electric vehicle having a motor connected to a transmission and an engine connectable to the transmission via a disconnect clutch and the motor. In a case such as where the disconnect clutch has a small torque capacity, the engine speed (the speed on the input side of the disconnect clutch) is lower than the motor speed (the speed on the output of the disconnect clutch), and the driver tips-in to the accelerator pedal, the engine speed is to be increased as quickly as possible to be greater than the motor speed such that the torque capacity of the disconnect clutch can be increased as quickly as possible to allow engine torque to be provided to the driveline to accelerate the vehicle. The engine speed is to be greater than the motor speed before the disconnect clutch is closed to ensure that the engine is only allowed to accelerate the motor and vehicle. The engine speed is to be allowed to increase as rapidly as possible to allow the engine to provide torque to the driveline as quickly as possible. However, if the speed difference is too large across the input and output sides of the disconnect clutch, then closing the disconnect clutch will cause a driveline disturbance. So the engine speed and the motor speed are to be quickly synchronized before the torque capacity on the disconnect clutch can be increased.

As described, the controller and the control strategy allow the engine torque to increase rapidly when the driver tips-in to the accelerator pedal. The controller and the control strategy monitor the engine speed increase and compare the engine speed to the motor speed. The difference between the two speeds is the slip across the disconnect clutch. The clutch continues to have little torque capacity during this time. When the engine speed approaches the motor speed (i.e., when the slip becomes small), the controller and the control strategy reduce the engine torque to slow the rate at which the engine speed is rising. The amount of the engine torque reduction depends on the amount of slip. The less slip, the more the engine torque is reduced. With the engine torque reduced, the engine speed slowly increases to just above the motor speed. Once the engine speed is just above the motor speed, the two speeds are synchronized enough to allow disconnect clutch engagement without disturbing the driveline. The engine torque and the disconnect clutch torque can then be increased together. A small slip across the disconnect clutch can be monitored and maintained using clutch torque to prevent any driveline disturbance while the engine and disconnect clutch torques are increasing. Eventually the clutch plates of the disconnect clutch will lock. Once the engine torque has been ramped back to normal levels, the clutch torque capacity can continue to increase to lock the disconnect clutch.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A method for a vehicle having an engine connectable to a traction motor via a clutch, comprising:
    increasing engine torque while the clutch is disengaged and engine speed is less than motor speed by more than a slip threshold to increase the engine speed;
    reducing the engine torque upon the engine speed being less than the motor speed by less than the slip threshold;
    engaging the clutch upon the engine speed exceeding the motor speed.

2. The method of claim 1 further comprising:
    increasing the engine torque at a rate dependent on a difference between the motor speed and the engine speed prior to the engine torque being increased.

3. The method of claim 1 further comprising:
    increasing the engine torque based on a difference between the motor speed and the engine speed prior to the engine torque being increased.

4. The method of claim 1 wherein:
    the engine torque is decreased based on a difference between the motor speed and the engine speed upon detecting that the engine speed is less than the motor speed by less than the slip threshold.

5. The method of claim 1 further comprising:
    increasing the engine torque while the clutch is being engaged.

6. The method of claim 1 wherein:
    the engine torque is modulated in response to initiation of a tip-in event.

7. A system for a vehicle having an engine selectively coupled in series with a traction motor and a transmission by a clutch, comprising:
    a controller configured to modulate engine torque while the clutch is disengaged and while engine speed is less than motor speed to increase the engine speed and engage the clutch in response to the engine speed becoming greater than the motor speed;

wherein the controller is further configured to modulate the engine torque by increasing the engine torque to an increased level to increase the engine speed while the engine speed is less than the motor speed by more than a slip threshold and then cutting the engine torque to a reduced level from the increased level once the engine speed is less than the motor speed by less than the slip threshold to thereby slow the engine speed increase.

8. The system of claim 7 wherein:
the controller is further configured to increase the engine torque at a rate dependent on a difference between the motor speed and the engine speed prior to the engine torque being increased.

9. The system of claim 7 wherein:
the increased level of the engine torque is dependent on a difference between the motor speed and the engine speed prior to the engine torque being increased.

10. The system of claim 7 wherein:
the reduced level of the engine torque is dependent on a difference between the motor speed and the engine speed in response to the controller detecting that the engine speed is less than the motor speed by less than the slip threshold.

11. The system of claim 7 wherein:
the controller is further configured to increase the engine torque from the reduced level to a desired level while the clutch is being engaged.

12. The system of claim 7 wherein:
the controller is further configured to modulate the engine torque in response to detecting initiation of a tip-in event.

13. A hybrid vehicle comprising:
a traction motor connected to a transmission;
an engine selectively coupled in series with the motor by a clutch; and
a controller communicating with the motor and the engine and configured to modulate engine torque while the clutch is disengaged and while engine speed is less than motor speed to increase the engine speed, and further configured to engage the clutch in response to the engine speed exceeding the motor speed;
wherein the controller is further configured to modulate the engine torque by increasing the engine torque to an increased level to increase the engine speed while the engine speed is less than the motor speed by more than a slip threshold and then reducing the engine torque to a reduced level from the increased level once the engine speed is smaller than the motor speed by less than the slip threshold.

14. The vehicle of claim 13 wherein:
the controller is further configured to increase the engine torque at a rate dependent on a difference between the motor speed and the engine speed prior to the engine torque being increased.

15. The vehicle of claim 13 wherein:
the increased level of the engine torque is dependent on a difference between the motor speed and the engine speed prior to the engine torque being increased.

16. The vehicle of claim 13 wherein:
the reduced level of the engine torque is dependent on a difference between the motor speed and the engine speed upon the controller detecting that the engine speed is less than the motor speed by less than the slip threshold.

17. The vehicle of claim 13 wherein:
the controller is further configured to modulate the engine torque upon detecting initiation of a tip-in event.

* * * * *